3,278,589
PREPARATION OF ESTERS OF TERPENE ALCOHOLS AND THEIR HOMOLOGUES
Igor Scriabine, Lyon, Rhone, France, assignor to Rhone-Poulenc S.A., Paris, France, a corporation of France
No Drawing. Filed Nov. 21, 1963, Ser. No. 325,462
Claims priority, application France, Nov. 26, 1962, 916,609
9 Claims. (Cl. 260—489)

The present invention relates to a process for the preparation of esters of carboxylic organic acids with alcohols selected from the class consisting of the terpene alcohols and their homologues, from the said acids and conjugated diolefins selected from the class consisting of isoprene and its homologues. It concerns more especially a process for the preparation of geraniol esters directly from monocarboxylic organic acids and isoprene.

It is known that in the reaction of a carboxylic acid with isoprene, in the presence or absence of a strong acid as catalyst, there simultaneously occur an esterification and a polymerisation of the isoprene. The reaction thus leads to the formation of a mixture of esters and terpene hydrocarbons comprising especially (a) esters of 3-methyl-but-2-ene-1-ol, commonly called prenyl esters, resulting from the condensation of one molecule of acid with one molecule of isoprene; (b) esters of linear or cyclic isomeric monoterpene alcohols (e.g. esters of geraniol, linalöol, terpineol and other isomers) resulting from the reaction of one molecule of organic acid with two molecules of isoprene; and (c) esters of sesquiterpene alcohols (esters of farnesol and nerolidol), diterpene alcohols and polyterpene alcohols resulting from the reaction of one molecule of organic acid with 3, 4, or more than 4 molecules of isoprene.

While the prenyl esters have found substantially no use, the esters of monoterpene alcohols of the fraction designated (b) above are constituents of essential oils very popular in perfumery. The esters of sesquiterpene alcohols and certain esters of polyterpene alcohol are also used in perfumery, although to a smaller extent.

Of the esters of monoterpene alcohols, those of geraniol are of very particular interest because of their characteristic odor, by reason of which they are used in the preparation of synthetic essential oils. In addition, they give on hydrolysis geraniol, which is itself a valuable intermediate product employed in the synthesis of β-ionone and of vitamin A.

The polymerisation of isoprene in acetic acid medium in the presence of catalytic quantities of concentrated sulphuric acid [Wagner, Jauregg, Ann. Chem. 496, 52 (1932)] or of toluene-p-sulphonic acid [Lennartz, Zeitschr. Naturforsch. 1, 689 (1946)], gives, however, only relatively low yields of monoterpene esters and especially of geranyl esters. Unsatisfactory results are also obtained in the preparation of geraniol by reaction of dichloracetic acid with isoprene in the absence of a catalyst, followed by saponification, as described in United States Patent No. 2,460,291.

It is also known [Midgley, Henne—J. Amer. Chem. Soc. 51, 1294 (1929)] that linear dimerisation of isoprene leads to a mixture of dimethyl-octa-2,6-diene isomers, and that this dimerisation may be carried out by maintaining the isoprene in contact with activated aluminium silicates [Wagner, Jauregg, Ber. 76, 1161–65 (1943)], but the yields are low and it is not known whether or not these catalysts have a selective action on the dimerisation and preponderantly favour the formation of one isomer rather than the others.

It has now been found that when isoprene or a homologue thereof is reacted with a monocarboxylic organic acid, using an activated clay as catalyst, mixtures of esters of terpene alcohols are obtained, which are richer in esters of monoterpene alcohols than the mixtures obtained by the earlier processes, and more particularly that the geraniol esters are formed (when isoprene is used) preponderantly in relation to the isomeric esters of monoterpene alcohols.

The following description is given in relation to the use of isoprene, itself but it is to be understood that homologues thereof, e.g. 2-methyl-penta-1,3-diene and 2,3-dimethylbuta-1,3-diene, can also be used. The reaction conditions in such a case remain the same.

The process of the invention comprises reacting a conjugated diolefin selected from the class consisting of isoprene and the homologues thereof which are conjugated diolefins, at an elevated temperature in an inert atmosphere and in the presence of a catalytically effective amount of an activated clay, with a molecular excess of an aliphatic carboxylic acid, and separating for re-use, unreacted conjugated diolefin, unreacted aliphatic carboxylic acid, and esters resulting from reaction of one mole of conjugated diolefin with one mole of aliphatic carboxylic acid and also separating the esters of monoterpene alcohols from esters derived from more highly condensed compounds.

The activated clays employed as catalyst include, for example, bentonite, kaolin and montmorillonite, which have been subjected to a chemical treatment, generally with a mineral acid, to improve their adsorbent properties. These products, which are defined in R. E. Kirk and D. F. Othmer, "Encyclopedia of Chemical Technology" 4, 53–57 (1951), or in Thorpe's Dictionary of Applied Chemistry, 4th ed. par. IV. pp. 246–50, are currently marketed under a large variety of trade names. They can all serve as catalysts in the process of the invention. In addition, they have the advantage over the acid catalysts previously employed that they are insoluble in the reaction medium and can consequently be readily eliminated therefrom by simple filtration. They can be used in a proportion of 1% to 10% by weight calculated on the diolefin treated. Generally, a proportion of 6% to 8% is suitable.

The carboxylic acids employed in the new process include, more especially, saturated aliphatic acids having from 1 to 4 carbon atoms, such as for example acetic acid, propionic acid or butyric acid, and more especially acids whose monoterpene esters have interesting properties, e.g. acetic acid. The proportion of acid employed in relation to the diolefin plays an important part in the reaction, since too great an excess of acid gives rise to the preponderant formation of prenyl esters and a deficiency of acid favours the formation of non-esterified hydrocarbons to the detriment of the desired esters.

In order to obtain the esters of monoterpene alcohols in good yield, it is advantageous to employ the carboxylic acids in a proportion of from 3 to 10 moles per mole of isoprene, and preferably in a proportion of 4 to 7 moles per mole of isoprene. The excess of acid which does not enter into the reaction serves as a solvent and may be recycled when the unconverted isoprene has been separated from the reaction mass.

In order to limit the polymerization as far as possible to the formation of the dimer, it is advantageous to add to the reaction medium a polymerization inhibitor such as hydroquinone, p-t-butyl-pyrocatechol, methylene blue, or phenthiazine. On the other hand, in order to avoid the formation of by-products of hydrolysis, the operation should be carried out in a substantially anhydrous medium. Since activated earths often contain a substantial amount of water, and it is difficult to dehydrate them by heating without reducing their chemical activity, a convenient means of carrying out the dehydration of the medium consists in adding to the organic acid employed a quantity of its anhydride sufficient to eliminate the water introduced by the starting materials.

The reaction of the organic acids with isoprene must take place under moderate operating conditions. The temperature must not be too high, in order to avoid secondary reactions of isomerization, cyclization, and polymerization to a high degree. The optimum temperature may vary a little according to the acid, the quantity of catalyst, and the proportions of reactants employed. However, good results are generally obtained when the operation is carried out at a temperature between 50° C. and 100° C. In the particular case of the reaction of isoprene with acetic acid, the best geranyl acetate yields are obtained at a temperature in the neighbourhood of 70° C.

This reaction must be carried out in the absence of oxygen under a gas atmosphere which is inert under the operating conditions, for example nitrogen, and under a sufficient pressure to maintain the isoprene in the liquid state within the reaction mass. In practice, the operation is conveniently carried out in an autoclave with a nitrogen pressure of 3 to 5 atmospheres at the start. It is best to maintain good stirring throughout the duration of the reaction. Again in order to limit the formation of products having an excessive degree of polymerization, it is desirable to stop the reaction when the proportion of isoprene converted is between 15 and 40 mole percent. With some activated clays, it is possible to reach a degree of conversion of the isoprene of 35%, while obtaining a good yield of geraniol esters.

The mixture obtained may be worked up in the following way: the catalyst is separated from the reaction mass by filtration, the unconverted isoprene and the unreacted organic acid are recovered by distillation, and the remaining mixture is fractionated into a fraction rich in prenyl esters and a fraction containing the esters of monoterpene, sesquiterpene and higher terpene alcohols. The geranyl and neryl esters are separated by rectifying the said second fraction under reduced pressure.

The monoterpene esters and the sesquiterpene esters thus obtained may be subjected to known saponifying treatments to convert them into the corresponding alcohols. The monoterpene ester fraction thus gives a mixture of alcohols which may still contain a small quantity of terpene hydrocarbons, which can be eliminated by any appropriate treatment. Geraniol and nerol may be separated by rectification from the mixture of monoterpene alcohols thus purified. Farnesol can be separated by rectification from the sesquiterpene alcohols from the sesquiterpene ester fraction.

In addition, it has been found that under the operating conditions, the prenyl esters may also combine with one or more molecules of isoprene to give mono-, sesqui- and polyterpene alcohol esters. It is therefore possible to recycle the prenyl esters emanating from an earlier operation and thus to improve the monoterpene ester yield based on the isoprene consumed. Thus, by carrying out this recycling on four consecutive batches, yields of 45–47% of monoterpene alcohol esters, based upon the isoprene consumed, have been obtained.

The following examples illustrate the invention.

*Example 1*

Into a one liter stainless-steel autoclave provided with a steam circulation jacket and a stirring system is charged 412 g. of glacial acetic acid, 68 g. of isoprene, 0.2 g. of hydroquinone and 5 g. of the anhydrous activated clay marketed under the name "Clarit Spezial A." The autoclave is purged with nitrogen, a nitrogen pressure of 3 atmospheres is set up, and the autoclave is then heated rapidly to 100° C. and held at this temperature for 15 minutes with stirring, the pressure reaching 7 atmospheres. The reaction is then stopped by rapid cooling and the catalyst is filtered off. The filtrate, which has a slight yellow color, is poured into four times its volume of a 15% aqueous solution of sodium chloride. The organic layer is decanted and washed with 20 cc. of a 15% aqueous solution of sodium chloride and then with a 5% aqueous solution of sodium carbonate until it is completely neutral. The organic layer is then dried over magnesium sulphate. By distillation under normal pressure, there are recovered 57 g. of unconverted isoprene, which corresponds to a conversion of 16% of the isoprene. There remain 15.6 g. of condensation product, which give on fractionation under reduced pressure: fraction I, B.P. 71–90° C. under 50 mm. Hg, 8.7 g.; fraction II, B.P. 67–130° C. under 10 mm. Hg, 4.9 g.; residue: 2 g. of mixture consisting of polyterpene hydrocarbons and sesquiterpene and polyterpene alcohol acetates.

From fraction I are separated by distillation 7.4 g. of prenyl acetate. Fraction II, which consists of 4.08 g. of monoterpene alcohol acetates (as determined by the measurement of the acetyl number), the remainder consisting of monoterpene hydrocarbons, may optionally be used as such in perfumery. However, it is more useful to extract therefrom by rectification geranyl acetate, of which the quantity produced is 2.55 g. (as determined by vapor phase chromatography). The geranyl acetate yield, calculated on the basis of the converted isoprene, is 16%.

If this experiment is repeated, replacing the activated earth by 0.2 g. of concentrated sulphuric acid, there are obtained at the end of the operation 16.2 g. of a reaction product containing 8.44 g. of prenyl acetate and 4 g. of monoterpene alcohol acetates, in which there is only 0.73 g. of geranyl acetate, which corresponds to a yield of 4.5% on the converted isoprene.

*Example 2*

By proceeding as in the preceding example, but employing as catalyst the anhydrous activated clay marketed under the name "Clarsil Ceca," and stopping the operation at the end of 15 minutes, a degree of conversion of the isoprene of 27% is reached, and there are obtained 24.6 g. of a mixture containing 8.85 g. of prenyl acetate and 7 g. of monoterpene acetates, including 3.65 g. of geranyl acetate. The geranyl acetate yield is thus 14%, calculated on the converted isoprene.

If the same experiment is repeated, employing 0.4 g. of concentrated sulphuric acid as catalyst, the degree of conversion of the isoprene reaches 28% and there are obtained 26.5 g. of reaction product containing 13.10 g. of prenyl acetate and 4.41 g. of acetates of isomeric monoterpene alcohols, including only 1.26 g. of geranyl acetate, corresponding to a yield of 4.6% of geranyl acetate.

By repeating the experiment, but using 0.4 g. of toluene-p-sulphonic acid as catalyst instead of activated earth and stopping the operation at the end of 40 minutes, a degree of conversion of the isoprene equal to 32% is reached, and there are obtained 30.1 g. of condensate containing 15.4 g. of prenyl acetate and only 3.7 g. of monoterpene alcohol acetate, including 2 g. of geranyl acetate, which corresponds to a yield of 6.3% of geranyl acetate.

*Example 3*

In an autoclave identical to that described in Example 1, 406 g. of acetic acid are reacted with 68 g. of isoprene containing 0.2 g. of hydroquinone, in the presence of 4 g. of the anhydrous activated clay marketed under the name "CLARSIL LC." The reaction mass is heated to 70° C. and maintained at this temperature for 2 hours under a nitrogen pressure of 3 atmospheres. The reaction is then stopped. The degree of conversion of the isoprene is 34.2% (determined after recovery of the unconverted isoprene). By treating the mass as indicated in Example 1, there are obtained 33.5 g. of reaction product containing 12.5 g. of prenyl acetate and 9.9 g. of monoterpene alcohol acetate, including 7.7 g. of geranyl acetate. The geranyl acetate yield is thus 19.6%, based on the converted isoprene.

Example 4

By reacting 1.68 g. of isoprene (containing 0.2 g. of hydroquinone) under the same conditions as described in Example 1 with 447 g. of propionic acid in the presence of 5 g. of "CLARSIL CECA," for 45 minutes at 100° C. there were obtained 26.6 g. of condensation product containing 8 g. of prenyl propionate and 6.7 g. of propionic esters of isomeric monoterpene alcohols.

Example 5

Into a one liter autoclave are charged: 41 g. of 2-methylpenta-1,3-diene; 206 g. of anhydrous acetic acid; 2.5 g. of anhydrous "CLARSIL LC"; and 0.02 g. of p-t-butylpyrocatechol. The autoclave is purged with nitrogen, a nitrogen pressure of 3 atmospheres is set up and the autoclave is then heated to a temperature of 70° C. which is maintained for 30 minutes, with good stirring. The degree of conversion of the diolefin then reaches 9.4%. By treating the reaction mass as in Example 1, there are isolated 5 g. of condensation product containing 1.93 g. of monomer acetate and 1.25 g. of acetates derived from the dimers. The yield of these dimer esters is 23.4%; calculated on the converted monomer.

Example 6

By proceeding as in the preceding example with 41 g. of 2,3-dimethylbuta-1,3-diene and heating for 40 minutes at 70° C., the degree of conversion of the diene reaches 11.5%. There are isolated 7.7 g. of condensation product containing 2.84 g. of monomer acetate and 1.57 g. of acetates derived from the dimers. The yield in the case of the latter esters is 24.4% based on the converted monomer.

Example 7

Into a one-liter autoclave are charged 62 g. of isoprene, 412 g. of acetic acid, 3 g. of acetic anhydride, 5 g. of "CLARSIL LC," and 0.02 g. of p-t-butylpyrocatechol. There are added to this reaction mass 14.4 g. of a mixture containing 11.5 g. of prenyl acetate and 2.9 g. of monoterpene hydrocarbons emanating from a preceding operation. After flushing with nitrogen, a nitrogen pressure of 3 atmospheres is set up and heating is effected for 2 hours at 70° C. with stirring, whereafter the reaction mass is worked up as described in Example 1. There are thus isolated 36.9 g. of condensation product, which give on fractionation in vacuo: fraction I, B.P.$_{50}$ 72–92° C., 17.7 g., containing 13.7 g. of prenyl acetate and 4 g. of hydrocarbons; fraction II, B.P.$_{10}$ 65–133° C., 13.3 g. containing 11.2 g. of acetates of monoterpene alcohols, including 7.02 g. of geranyl acetate, and 2 g. of terpene hydrocarbons; residue, 5.9 g. formed of acetates of sesqui- and polyterpene alcohols and of polyterpene hydrocarbons. Thus, the geranyl acetate yield is 26% calculated on the converted isoprene.

Example 8

In a stainless-steel autoclave having a capacity of 6 liters, a first operation is carried out with 637 g. of isoprene, 4378 g. of glacial acetic acid, 32 g. of acetic anhydride, 50 g. of "CLARSIL LC," 0.6 g. of p-t-butylpyrocatechol and 197 g. of a mixture containing 152 g. of prenyl acetate and 45 g. of monoterpene hydrocarbons emanating from a preceding operation. The autoclave is purged by flushing with nitrogen and a nitrogen pressure of 3 atmospheres is set up. The mass is then rapidly heated with stirring to a temperature of 70° C. which is maintained for 2 hours. The autoclave is then cooled to 20° C., and the catalyst is separated by filtration under a nitrogen atmosphere and is washed with 50 g. of glacial acetic acid. To the filtrate-washing mixture is added a solution of 3 g. of phenthiazine in 150 g. of glacial acetic acid and the product is continuously distilled in a stainless-steel instantaneous evaporator under an absolute pressure of 400 mm. Hg. There are thus obtained 4000 g. of a distillate which passes over at 84–94° C. and contains the unconverted isoprene and the acetic acid, which can be re-used. From the product remaining in the evaporator, the prenyl acetate is separated by fractionation at a temperature below 90° C. under 50 mm. Hg, and recharged into the autoclave with the distillate previously obtained. A second operation is then carried out by completing this charge with 32 g. of acetic anhydride, 142 g. of isoprene, 50 g. of "CLARSIL LC," and 0.6 g. of p-t-butylpyrocatechol. The mixture is subjected to the same operations as above. Three further similar operations are carried out, using each time the recyclable products of the preceding operation and completing with quantities of isoprene, acetic anhydride, catalyst and polymerization inhibitor equal to those employed in the second operation.

At the end of the cycle, the products obtained in each operation are combined after elimination of the recyclable products and are fractionated under a vacuum of 10 mm. Hg. There are thus isolated, between 68° C. and 130° C., 520 g. of a fraction containing 470 g. of acetates of isomeric monoterpene alcohols, of which 260 g. are geranyl acetate. The residue of the fractionation, weighing 293 g., is composed of acetates of sesquiterpene alcohols and of other condensation products.

In the course of the last operation, 354 g. of isoprene, 189 g. of prenyl acetate and 4948 g. of acetic acid are recovered. The yields of acetates of monoterpene alcohols and of geranyl acetate calculated on the isoprene consumed are therefore 46% and 23% respectively.

Example 9

By proceeding as in the preceding example with an initial charge of 618 g. of isoprene, 4130 g. of acetic acid, 32 g. of acetic anhydride, 50 g. of "CLARSIL LC," 0.6 g. of p-t-butylpyrocatechol and 294 g. of a mixture containing 160 g. of prenyl acetate emanating from an earlier operation, there is obtained after heating for 2 hours at 70° C. a reaction mass from which the unconverted isoprene, the acetic acid and the phenyl acetate are separated by distillation as indicated in the preceding example, in order to be recycled. To the products thus recycled, are added 218 g. of isoprene, 32 g. of acetic anhydride, 0.6 g. of p-t butylpyrocatechol and 50 g. of "CLARSIL LC," and the previously described procedure is followed. Four further similar operations are carried out, using each time the recyclable products of the preceding operation. In all, there were thus converted in the six operations 1079 g. of isoprene, and there are obtained 1226 g. of mono-, sesqui- and polyterpene acetates, which on rectification give 804.5 g. of a fraction distilling at 60–135° C. under 10 mm. Hg, which contains the monoterpene acetates. This fraction, saponified by means of aqueous alcohol-containing sodium hydroxide, gives the monoterpene alcohols, which are washed with a mixture of aqueous methanol (85/15) and light petroleum spirit to remove traces of terpene. These alcohols are thereafter carefully rectified, and there are obtained 229.6 g. of geraniol containing 9–10% of nerol. (Yield 18.8% calculated on the converted isoprene).

The residue remaining after the distillation of the monoterpene acetates (422 g.), saponified and treated in the same way as the latter, gives a mixture of alcohols from which there are separated by distillation under a high vacuum 128 g. of a fraction having a boiling point of 65–125° C./0.8 m. Hg, which contains the sesquiterpene alcohols. From this last fraction, there are isolated 34.5 g. of farnesol, B.P.=115–120° C./0.8 mm. Hg, having a purity of 93–94%.

I claim:
1. Process for the preparation of esters of monoterpene alcohols and their homologues which comprises reacting under anhydrous conditions a conjugated diolefin selected from the class consisting of isoprene, 2-methylpenta-1,3-diene, and 2,3-dimethylbuta-1,3-diene, at an elevated temperature below the decomposition temperature of the reactants and products, in an inert atmosphere under a pres- sure sufficient to keep the diolefin liquid and in the presence of a catalytically effective amount of an acid treated clay with a molecular excess of an alkanoic acid of 1 to 4 carbon atoms, and separating unreacted conjugated diolefin, unreacted alkanoic acid, esters resulting from reaction of one mole of conjugated diolefin with one mole of alkanoic acid, esters of monoterpene alcohol, and esters derived from more highly condensed compounds.

2. Process according to claim 1, in which the clay is selected from the class consisting of bentonite, kaolin, and montmorillonite.

3. Process according to claim 1, in which the reaction is carried out in the presence of a polymerization inhibitor.

4. Process according to claim 1 in which the reaction is terminated after 15 to 40 mole percent of the conjugated diolefin has reacted.

5. Process according to claim 4 in which the reaction is carried out in the presence of 1% to 10% by weight of acid activated clay based upon the weight of the conjugated olefin.

6. Process according to claim 5 in which the reaction is carried out at 50° C.–100° C.

7. Process for the preparation of esters of monoterpene alcohols and their homologues which comprises reacting under anhydrous conditions a conjugated diolefin selected from the class consisting of isoprene, 2-methylpenta-1,3-diene, and 2,3-dimethylbuta-1,3-diene at 50°–100° C. under an initial pressure of 3 to 5 atmospheres of nitrogen, and in the presence of 1% to 10% by weight of acid activated clay based upon the weight of the conjugated diolefin with, per mole of conjugated diolefin, 3 to 10 moles of an alkanoic acid of 1 to 4 carbon atoms, and when 15 to 40 mole percent of the conjugated diolefin has reacted, separating unreacted conjugated diolefin, unreacted alkanoic acid, esters resulting from reaction of one mole of conjugated diolefin with one mole of alkanoic acid, esters of monoterpene alcohols, and esters derived from more highly condensed compounds.

8. Process for the preparation of geranyl acetate which comprises reacting under anhydrous conditions and in the presence of a polymerization inhibitor isoprene at 50° C. to 100° C. in a nitrogen atmosphere of 3 to 5 atmospheres and in the presence of 1% to 10% by weight of acid activated clay, based on the weight of isoprene, with, per mole of isoprene, 3 to 10 moles of anhydrous acetic acid, and when 15 to 40 mole percent of isoprene has reacted, fractionally distilling the product to separate unreacted isoprene, unreacted acetic acid, prenyl acetate, and geranyl acetate, from the relatively non-volatile residue.

9. Process according to claim 8 in which the reaction mixture comprises prenyl acetate recycled from a previous operation of the reaction.

References Cited by the Examiner

UNITED STATES PATENTS

| | | | |
|---|---|---|---|
| 2,020,673 | 11/1935 | Dreyfus | 260—497 |
| 3,073,860 | 1/1963 | Gilbert | 260—497 |
| 3,096,365 | 7/1963 | Heisler | 260—497 |

OTHER REFERENCES

Lennartz: Zeitschr. Naturforsch., vol. 1, p. 689 (1946).
Midgley: J.A.C.S., vol. 51, p. 1294 (1929).
Wagner: Ann. Chem., vol. 496, p. 52 (1932).
Wagner: Ber., vol. 76, pp. 1161–65 (1943).

LORRAINE A. WEINBERGER, *Primary Examiner.*

LEON ZITVER, *Examiner.*

D. P. CLARKE, V. GARNER, *Assistant Examiners.*